United States Patent
Pradas et al.

(10) Patent No.: US 9,307,570 B2
(45) Date of Patent: Apr. 5, 2016

(54) CONTROLLING USER EQUIPMENT NODES FOR ENHANCED UPLINK AND USER EQUIPMENT NODES CONFIGURED FOR ENHANCED UPLINK

(71) Applicant: Telefonaktiebolaget L M Ericsson (publ), Stockholm (SE)

(72) Inventors: Jose Luis Pradas, Stockholm (SE); Mark Curran, County Carlow (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 190 days.

(21) Appl. No.: 14/004,098

(22) PCT Filed: Aug. 2, 2013

(86) PCT No.: PCT/SE2013/050945
§ 371 (c)(1),
(2) Date: Sep. 9, 2013

(87) PCT Pub. No.: WO2014/021775
PCT Pub. Date: Feb. 6, 2014

(65) Prior Publication Data
US 2014/0066080 A1    Mar. 6, 2014

Related U.S. Application Data

(60) Provisional application No. 61/679,230, filed on Aug. 3, 2012.

(51) Int. Cl.
*H04W 72/00* (2009.01)
*H04W 76/04* (2009.01)
*H04W 8/26* (2009.01)

(52) U.S. Cl.
CPC ............. *H04W 76/046* (2013.01); *H04W 8/26* (2013.01)

(58) Field of Classification Search
CPC ..... H04W 72/04; H04W 84/08; H04W 28/04; H04W 52/02; H04W 80/04; H04L 47/10; H04L 29/06

USPC .......... 455/450, 509; 370/329, 311, 328, 252, 370/331, 401
See application file for complete search history.

(56) References Cited

U.S. PATENT DOCUMENTS

| 2007/0133456 A1* | 6/2007 | Ding ............................. 370/328 |
| 2009/0181710 A1* | 7/2009 | Pani et al. ..................... 455/509 |

(Continued)

FOREIGN PATENT DOCUMENTS

WO    WO 2009/058089 A1    5/2009

OTHER PUBLICATIONS

3GPP TS 25.331 V10.8.0 (Jun. 2012) "3rd Generation Partnership Project; Technical Specification Group Radio Access Network; Radio Resource Control (RRC); Protocol Specification" (Release 10).

(Continued)

*Primary Examiner* — Charles Appiah
*Assistant Examiner* — Alexander Yi
(74) *Attorney, Agent, or Firm* — Myers Bigel & Sibley, P.A.

(57) ABSTRACT

Methods for controlling uplink transmission of data to a network node of a communications system a user equipment node are disclosed. The methods include receiving parameters to configure enhanced uplink in CELL_FACH state, determining whether the user equipment node is able to communicate on an E-DCH in CELL_FACH state and determining whether additional defined conditions have been satisfied, and performing a cell update operation to obtain an E-RNTI value responsive to determining that the user equipment node is not able to communicate on an E-DCH in CELL_FACH state. The methods may also include transmitting uplink data on an E-DCH transport channel to the network node responsive to determining that the user equipment node is able to communicate on an E-DCH in CELL_FACH state and determining that the additional defined conditions have been satisfied. Related user equipment nodes are also disclosed.

23 Claims, 4 Drawing Sheets

(56) References Cited

U.S. PATENT DOCUMENTS

2010/0220623 A1* 9/2010 Cave et al. .................. 370/252
2011/0207465 A1* 8/2011 Dwyer et al. ................ 455/450

OTHER PUBLICATIONS

3GPP TS 25.331 V11.2.0 (Jun. 2012); ,3$^{rd}$ Generation Partnership Project; Technical Specification Group Radio Access Network; Radio Resource Control (RRC); Protocol Specification (Release 11), 3GPP Standard; F-06921 Sophia-Antipolis Cedex, France, Jul. 10, 2012.

Ericsson, ST-Ericsson "UE behavior when updating SIB5", 3GPP TSG-RAN WG2 #79, R2-123881, Qingdao, P.R. of China, Aug. 13-17, 2012.

International Search Report and Written Opinion Corresponding to International Application No. PCT/SE2013/050945; Date of Mailing: Nov. 13, 2013; 13 Pages.

Nokia Corporation, Nokia Siemens Networks, "Correction of RNTIs handling for Enhanced Uplink in CELL_FACH", 3GPP TSG-RAN WG2 Meeting #69, R2-101310, San Francisco, USA, Feb. 22-26, 2010.

International Search Report and Written Opinion Corresponding to International Application No. PCT/SE2013/050945; Date of Mailing: Nov. 12, 2013; 34 Pages.

* cited by examiner

CONTROLLING USER EQUIPMENT NODES FOR ENHANCED UPLINK AND USER EQUIPMENT NODES CONFIGURED FOR ENHANCED UPLINK

RELATED APPLICATIONS

The present application is a 35 U.S.C. §371 national stage application of PCT International Application No. PCT/SE2013/050945, filed in English on 2 Aug. 2013, which itself claims the benefit of and priority to U.S. Provisional Patent Application No. 61/679,230, filed Aug. 3, 2012, entitled "CONTROLLING USER EQUIPMENT NODES FOR ENHANCED UPLINK IN CELL_FACH AND SYSTEM INFORMATION CHANGE," the disclosures and contents of both of which are incorporated by reference herein in their entirety.

TECHNICAL FIELD

The present invention relates to communications networks. More particularly, and not by way of limitation, the present invention is directed to communications systems and methods that control communications between network nodes and user equipment nodes.

BACKGROUND

Wideband Code Division Multiple Access (WCDMA) is a mobile radio access network standard specified by a 3rd Generation Partnership Project (3GPP) and used in third generation wireless data/telecommunication systems.

An enhanced uplink transmission capability from the user equipment nodes (UEs) to the radio transceiver base station (Node B) was introduced in Release 6 to 3GPP WCDMA. The enhanced uplink provides improved uplink packet-data support with reduced round trip delay, high bit-rate availability and increased cell capacity.

In 3GPP WCDMA, the Radio Resource Control (RRC) protocol handles the control plane signaling between the UEs and the network. A UE can operate in one of a number of RRC states or modes. For example, a UE can operate in RRC idle mode when it has no connection. In connected mode, a UE can be directed to operate in a CELL_DCH (Dedicated Channel) state, a CELL_FACH (Forward access channel) state, a CELL_PCH (Cell Paging channel) state, or a URA_PCH (URA Paging channel) state.

As defined by 3GPP WCDMA Release 6, during a CELL_DCH state, a network node allocates dedicated resources for each UE.

Enhanced Uplink refers to a 3GPP mobile telephony protocol with increased uplink speeds, for example, up to 5.76 Mbit/s. The Enhanced Uplink feature is intended to improve the performance of uplink dedicated transport channels by increasing capacity and throughput and reducing delay.

When a UE transmits using the Enhanced Uplink protocol, it transmits data and control information on at least 3 physical channels, namely, the Dedicated Physical Control CHannel (DPCCH), the Enhanced-DPCCH (E-DPCCH), and the Enhanced Dedicated Physical Data CHannel (E-DPDCH). The DPCCH carries pilot bits that are known by the Node B as well as Layer 1 control information. The pilot bits are used as a reference by the Node B to estimate the radio channel conditions (e.g. searcher, channel estimation, frequency offset estimation, and signal to interference ratio). The E-DPCCH carries control information related to the enhanced dedicated physical data channel. The E-DPDCH carries the data bits.

Currently, UEs may sometimes fail when changing the CELL_FACH state to the CELL_DCH state, which may reduce the performance of the network.

SUMMARY

An object of some embodiments herein is to provide a mechanism that enhances the performance of the network. In particular, some embodiments provide methods for controlling uplink transmission of data to a network node of a communications system a user equipment node. The methods include receiving parameters to configure enhanced uplink in CELL_FACH state, determining whether the user equipment node is able to communicate on an Enhanced uplink Dedicated CHannel (E-DCH) in CELL_FACH state and determining whether additional defined conditions have been satisfied, and performing a cell update operation to obtain an Radio Network Temporary Identifier (E-RNTI) value for the user equipment node responsive to determining that the user equipment node is not able to communicate on an E-DCH CELL_FACH state. Accordingly, these methods may reduce the possibility of failure when switching from, for example, CELL_FACH state to CELL_DCH state.

Determining whether the user equipment lode is able to communicate on an E-DCH in CELL_FACH state may include determining whether the user equipment node has E-RNTI value that is available for use.

The methods may also include transmitting uplink data on an E-DCH transport channel to the network node responsive to the E-RNTI value being determined to be available for use and determining that the additional defined conditions have been satisfied.

The additional defined conditions include whether the user equipment node supports E-DCH transmission in CELL_FACH state, whether the information element "HS-DSCH common system information" has been received from the network node, and whether the information element "Common E-DCH system info" has been received from the network node.

Transmitting uplink data on an E-DCH transport channel to the network node may include transmitting uplink data on an E-DCH transport channel to the network node responsive determining that the E-RNTI value is available for use and that the additional defined conditions are satisfied.

The methods may further include transmitting data in CELL_FACH state on a Random Access Channel (RACH) responsive to determining that any of the additional defined conditions has not been met.

The methods may further include transmitting data in CELL_FACH state on a Random Access Channel (RACH) responsive to determining that the user equipment node does not have an E-RNTI value that is available for use.

In some embodiments, the methods may include determining, while the user equipment node is operating in CELL_FACH state, whether the following conditions are true:

1) the user equipment node supports Enhanced uplink Dedicated CHannel (E-DCH) transmission in CELL_FACH state, 2) an information element "HS-DSCH common system information" is included in a received system information block type 5 or 5bis, 3) an information element "Common E-DCH system info" is included in the received system information block type 5 or 5bis, and 4) a variable Enhanced uplink Dedicated CHannel (E-DCH) Radio Network Temporary Identifier (E-RNTI) is available to the user equipment node.

The methods may further include setting a variable in the user equipment node indicating that the user equipment node is ready for Common E-DCH operation to a value indicating FALSE responsive to determining that any of the conditions is not true.

The methods may further include setting the variable to a value indicating TRUE in response to determining that all of the conditions are true.

The methods may further include responding to receipt of parameters from the network node to configure enhanced uplink in CELL_FACH state and the variable having a value indicating FALSE, by continuing transmission of uplink data in CELL_FACH state on a Random Access CHannel (RACH) transport channel.

The methods may further include responding to receipt of parameters from the network node to configure enhanced uplink in CELL_FACH state and the variable having a value indicating TRUE by beginning transmission of uplink data on an E-DCH transport channel.

The methods may further include performing a cell update operation to obtain an E-RNTI value responsive to determining that the user equipment node does not have an E-RNTI value that is available for use.

Methods by a user equipment node for controlling uplink transmission of data to a network node of a communications system according to some embodiments include receiving an information element relating to Enhanced uplink Dedicated CHannel (E-DCH) transmission from the network node, determining whether the user equipment node has an available E-DCH Radio Network Temporary Identifier (E-RNTI), responsive to receipt of the information element, and performing a cell update operations in response to receipt of the information element and determination that the user equipment node does not have an available E-RNTI.

The information element may include a "Common E-DCH System Info" information element.

A user equipment node according to some embodiments includes a transceiver, and a processor coupled to the transceiver. The processor is configured to receive parameters using the transceiver to configure enhanced uplink in CELL_FACH state, to determine whether the user equipment node is able to communicate on an E-DCH CELL_FACH state, and to perform a cell update operation to obtain an E-RNTI value in response to determining that the user equipment node is not able to communicate on an E-DCH in CELL_FACH state.

In some embodiments, the user equipment node may transmit uplink data using the transceiver on an E-DCH transport channel to a network node responsive to determining that the user equipment node is able to communicate on an E-DCH in CELL_FACH state.

The processor may be further configured to determine whether additional defined conditions have been satisfied in response to receiving the parameters to configure enhanced uplink in CELL_FACH state.

The additional defined conditions may include whether the user equipment node supports E-DCH transmission in CELL_FACH state and/or Idle mode, whether the information element "HS-DSCH common system information" has been received from the network node, and whether the information element "Common E-DCH system info" has been received from the network node.

The processor may be further configured to transmit uplink data on an E-DCH transport channel to the network node responsive to determining that the E-RNTI value is available for use and that the additional defined conditions are satisfied.

The processor may be further configured to transmit data in CELL_FACH state on a Random Access Channel (RACH) responsive to determining that any of the additional defined conditions has not been met.

The processor may be further configured to transmit data in CELL_FACH state on a Random Access Channel (RACH) responsive to determining that the user equipment node does not have an E-RNTI value that is available for use.

The processor may be further configured to transmit data in CELL_FACH state on a Random Access Channel (RACH) responsive to determining that the user equipment node is not able to communicate on an E-DCH in CELL_FACH state.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Various embodiments disclosed herein are directed to methods and apparatus that operate in conjunction with the methods and apparatuses disclosed in 3GPP ETSI TS 25.331, version 10.8.0, Release 10 (2012-07), entitled "Universal Mobile Telecommunications System (UMTS) Radio Resource Control (RRC) Protocol Specification," which is incorporated herein by reference in its entirety. The invention, however, is not limited to this particular standard or to WCDMA 3GPP third generation communication systems. The invention may be embodied in other types of network nodes, UEs, and communication systems, including, but not limited to, 3GPP Long Term Evolution (LTE) systems.

Figure 1:
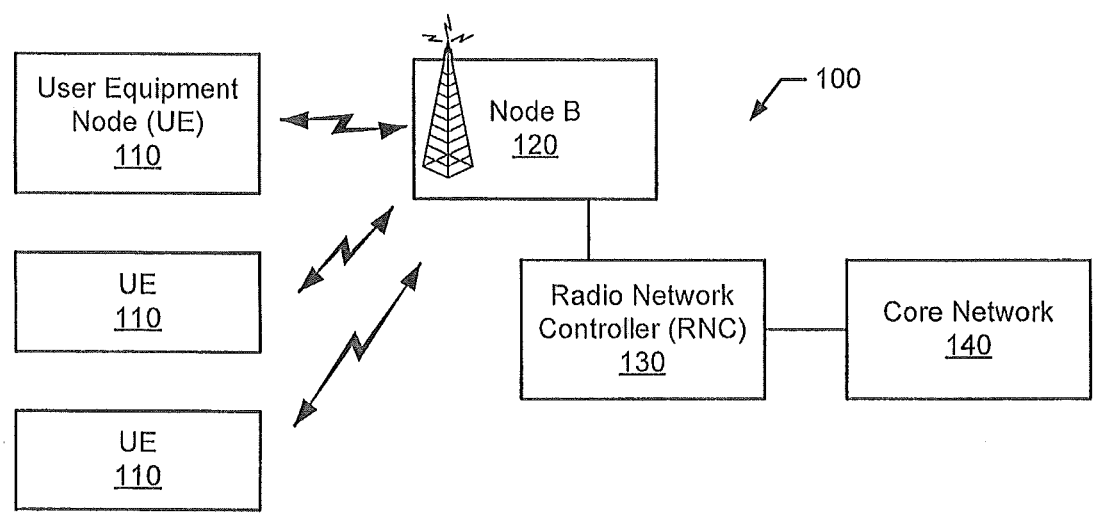
FIG. 1 is a block diagram of a communications system that can be configured to operate according to some embodiments disclosed herein.

An example third generation communications system 100 is shown in FIG. 1. The system 100 includes a plurality of user equipment nodes (UEs) 110 that communicate with radio transceiver base station (Node B) 120 through a radio air interface. The Node B 120 is controlled by a radio network controller (RNC) 130 and connected to a core network 140. The Node B 120 and the RNC 130 are referred to herein as the "network" for convenience of reference and without limitation to the scope of the term.

The UEs 110 of FIG. 1 may include, but are not limited to, mobile telephones ("cellular" telephones), data terminals, and/or other processing devices with wireless communication capability, such as, for example, portable computers, pocket computers, hand-held computers, laptop computers, electronic book readers, and video game consoles.

Support for enhanced uplink transmission in the CELL_FACH state and Idle mode was introduced in 3GPP WCDMA Release 8. In the CELL_FACH and CELL_DCH states, a UE 110 can utilize common enhanced uplink resources that are set up by the network node for transmission of data on the E-DPDCH. Enhanced uplink in the CELL_FACH state may also provide a seamless RRC connection setup process through which a transition from the common enhanced uplink resource (CELL_FACH state) to a dedicated enhanced uplink resource (CELL_DCH state) takes place.

When a UE 110 transmits data on the E-DPDCH in the CELL_FACH state, it utilizes a common network resource. When the UE 110 needs to make use of the resource for a longer time, the Radio Network Controller (RNC) 130 can switch the UE 110 from the CELL_FACH state to the CELL_DCH state. When the UE 110 switches to the dedicated channel state, the common resource is released and the network assigns a dedicated resource to the UE 110. For the uplink layer 1 processing in the Node B 120, the switch from the CELL_FACH state to the CELL_DCH state may entail a timing change, a change of uplink (UL) scrambling code, and possibly a change in a Transmission Time Interval (TTI). There can also be a change in the maximum data rate, and hence a change in the target signal-to-interference ratio (SIR).

When the network starts broadcasting the parameters to configure Enhanced Uplink in the CELL_FACH state and Idle mode, UEs 110 that are operating in the CELL_FACH state are mandated by the specification to use the Enhanced uplink Dedicated CHannel (E-DCH) to transmit their data. To do this, the UEs 110 need to have an E-DCH Radio Network Temporary Identifier (E-RNTI) and the proper configured Radio Bearer (RB) multiplexing option.

However, in the scenario explained above, a problem arises because the UEs 110 operating in the CELL_FACH state may not yet have received an E-RNTI from the network.

A System Information Block (SIB) contains the parameters to be used by the UEs 110 to access the network. When the network broadcasts the SIB parameters to UEs 110 to configure Enhanced Uplink in the CELL_FACH state and Idle mode, a Release 8 UE that supports Enhanced Uplink in CELL_FACH state and Idle mode will transmit its data on the Enhanced uplink Dedicated CHannel (E-DCH) after performing the defined random access procedure.

The network can change the SIBs at any moment. When the SIBs are modified, the network indicates occurrence of the modification to the UEs 110 by paging the UEs 110. The UEs 110 respond by operating to acquire the SIB information.

If, at a particular point in time, the network activates (starts broadcasting) the parameters to configure Enhanced Uplink in the CELL_FACH state and Idle mode, UEs 110 supporting this feature evaluate a set of variables. Among them, the variable READY_FOR_COMMON_EDCH is used by the UE to determine whether the UE should configure Enhanced Uplink in CELL_FACH state and Idle mode. When the UE sets the variable READY_FOR_COMMON_EDCH to a value indicating TRUE, the UE is mandated by the specification to use E-DCH to transmit its data. According to 3GPP ETSI TS 25.331, entitled "Universal Mobile Telecommunications System (UMTS) Radio Resource Control (RRC) Protocol Specification," the variable READY_FOR_COM-MON_EDCH is set by a UE to a value indicating TRUE when the UE determines that either of the following two conditions are met:

Condition 1), when the UE is in the CELL_FACH state or in Idle mode:
  i) the UE supports E-DCH transmission in CELL_FACH state and Idle mode;
  ii) the information Element (IE) "HS-DSCH common system information" is included in system information block type 5 or 5bis; and
  iii) the IE "Common E-DCH system info" is included in system information block type 5 or 5bis; or Condition 2), when the UE is in the CELL_PCH state:
  i) the LE supports E-DCH transmission in the CELL_FACH state and Idle mode;
  ii) the UE supports HS-DSCH reception in the CELL_PCH and URA_PCH states;
  iii) the IE "HS-DSCH paging system information" is included in system information block type 5 or 5bis;
  iv) the IF, "Common E-DCH system info" is included system information block type 5 or 5bis;
  v) the variable H-RNTI is set;
  vi) the variable E-RNTI is set; and
  vii) the variable C_RNTI is set.

In order to be able to transmit uplink data on an E-DCH (e.g., dedicated control channel—DCCH and/or dedicated Traffic Channel—DTCH data) while operating in the CELL_FACH state, the UE should have at least an E-RNTI (E-DCH Radio Network Temporary identity).

In the CELL_FACH state, the network may assign an E-RNTI to the UE via RRC signaling. For example, "Cell Update Confirm" and "RB reconfiguration" are messages which may be transmitted by the network to communicate an E-RNTI to the UE.

The radio bearer (RB) multiplexing options are updated responsive to: 1) the UE receiving the IEs "RB mapping info," "CCCH mapping info," "SRBI mapping info" and/or the IE "Transport format set"; 2) when transport channels, MAC-d flows, MAC-ehs reordering queues or E-DCH MAC-d flows are added or deleted; 3) when the UE performs a cell reselection or a state transition; or 4) when the UE releases a radio bearer (RB).

When Enhanced Uplink in the CELL_FACH state and Idle mode is not configured by the network, i.e. the information element (IE) "Common E-DCH system info" is not broadcast by the network, the UEs 110 do not have or keep an E-RNTI when the UEs 110 are in the CELL_FACH state.

When the network starts broadcasting the parameters to configure Enhanced Uplink in CELL_FACH state and Idle mode, UEs 110 that are operating in the CELL_FACH state are mandated by the specification to use E-DCH to transmit their data. As explained above, the UE needs an E-RNTI and a correct UL RB multiplexing option to be able to transmit on E-DCH. However, the UEs 110 operating in the CELL_FACH state in this situation may not have an E-RNTI and, therefore, should not always transmit data on an E-DCH. Nowhere in TS 25.331 nor the other related specifications is this situation disclosed and, furthermore, nowhere is a possible solution for this situation proposed.

Figure 2:
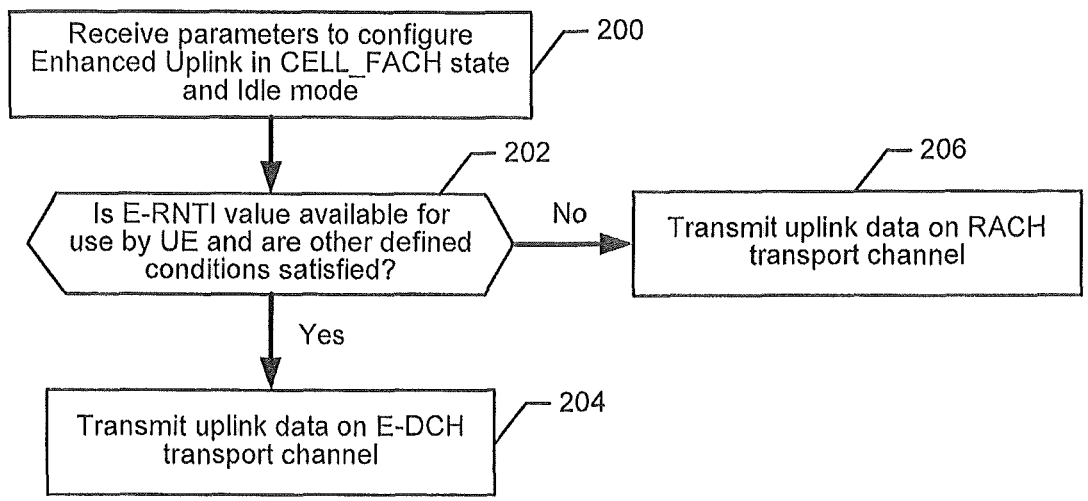
FIGS. 2-5 illustrates flowcharts of operation and methods that can be performed by a UE in accordance with some embodiments disclosed herein.

In accordance with one embodiment disclosed herein and illustrated in FIG. 2, in response to the UE receiving (block 200) parameters from the network to configure enhanced uplink CELL_FACH state and Idle mode, the UE 110 determines (block 202) whether it has an E-RNTI value available for use and, in some embodiments, whether other defined conditions are satisfied. The other defined conditions may include whether the UE 110 supports E-DCH transmission in CELL_FACH state and Idle mode, whether the IE "HS-DSCH common system information" has been received from the network, and/or whether the IE "Common E-DCH system info" has been received from the network. When the E-RNTI value is available for use and the other defined conditions are satisfied, the UE 110 begins transmitting (block 204) uplink data on the E-DCH transport channel. However, in contrast, when the UE 110 determines that the E-RNTI value is not available for use and/or the other defined conditions are not satisfied, the UE 110 continues transmitting (block 206) its uplink data in CELL_FACH state on the RACH transport channel.

Figure 3:
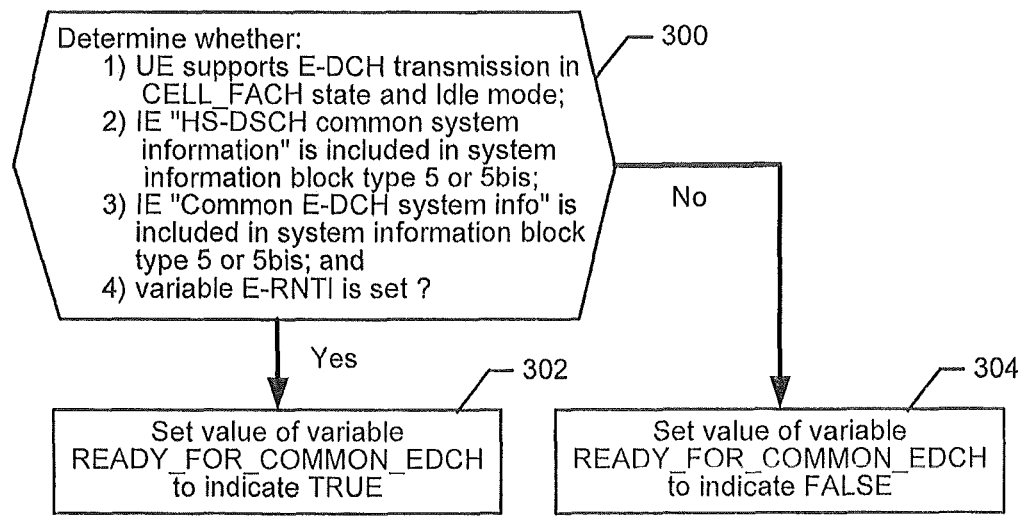
Figure 4:
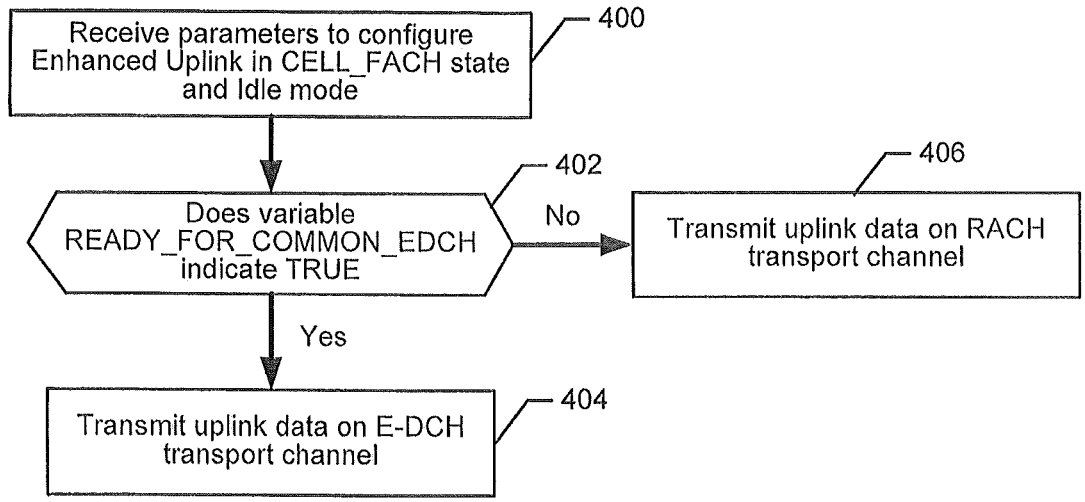

In a further embodiment illustrated in FIGS. 3 and 4, while the UE 110 is operating in the CELL_FACH state, the UE sets (block 302) the variable READY_FOR_COMMON_EDCH to a value indicating TRUE, in response to all of the following conditions being determined (block 300) to be TRUE:

1) the UE 110 supports E-DCH transmission in CELL_FACH state and Idle mode;
2) the IE "HS-DSCH common system information" is included in received system information block type 5 or 5bis;
3) the IE "Common E-DCH system info" is included in received system information block type 5 or 5bis; and
4) the variable E-RNTI is set (e.g., available for use during transmissions by the UE).

When any one of the conditions 1)-4) above are determined (block 300) by the UE 110 to be not TRUE, the variable READY_FOR_COMMON_EDCH is set (block 304) to a value indicating FALSE.

In response to the UE 110 receiving (block 400) parameters from the network to configure enhanced uplink in CELL_FACH state and Idle mode, the UE 110 determines (block 402) whether the variable READY_FOR_COMMON_EDCH is set to a value indicating TRUE or FALSE. When the value indicates TRUE, the UE 110 begins transmitting (block 404) uplink data on the E-DCH transport channel. In contrast, when the value indicates FALSE, the UE 110 continues transmitting (block 406) its uplink data in CELL_FACH state on the Random CHannel (RACH) transport channel.

The determination (block 300) of whether the conditions are satisfied (e.g., TRUE) may be carried out by the UE 110 responsive to the UE 110 receiving (block 400) parameters from the network to configure enhanced uplink in CELL_FACH state and Idle mode, although the determination (block 300) may instead or additionally be carried out responsive to other defined events.

Figure 5:
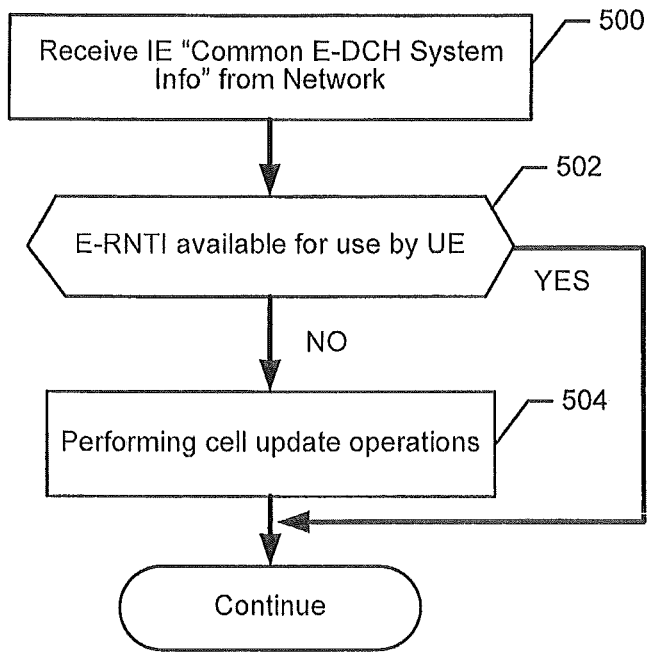

In accordance with another embodiment disclosed herein and illustrated in FIG. 5, when the System Information Block (SIB) is changed so that the IE "Common F-DCH System Info" is broadcast by the network, the UE 110 responds to receipt (block 500) of the IE "Common E-DCH System Info" by determining (block 502) whether it has an available E-RNTI (e.g., stored in the UE). When the E-RNTI is not available, the UE 110 performs cell update operations (block 504). The UE 110 can thereby attempt to obtain an E-RNTI through the cell update operations in order to be more ready to begin transmitting uplink data on E-DCH when instructed.

The embodiments of explained herein in the context of FIGS. 2-4 can avoid the UE entering an indeterminate state where certain conditions are satisfied under which it should being transmitting uplink data on an E-DCH but does not have an E-RNTI available to use during such transmissions. These embodiments make availability of the E-RNTI a condition precedent to any expectation that the UE will being transmitting on an E-DCH. Moreover, the embodiment explained in the context of FIG. 5 enables the UE to actively attempt to obtain an E-RNTI through cell update operations when the network broadcasts the IE "Common E-DCH system info" when the SIB changes.

Example User Equipment Node and Network Node Configurations

Figure 6:
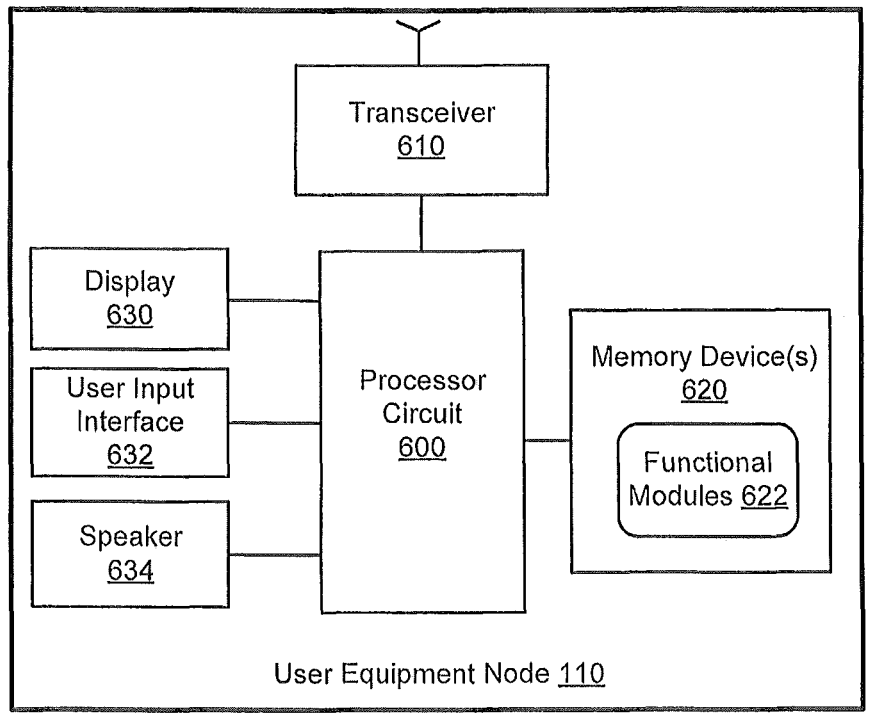
FIG. 6 is a block diagram of a UE that is configured according to some embodiments disclosed herein.

FIG. 6 is a block diagram of the user equipment node (UE) 110 of FIG. 1 that is configured according to some embodiments. The UE 110 includes a transceiver 610, a processor circuit 600, and a memory device(s) 620 containing functional modules 622. The UE 110 may further include a display 630, a user input interface 632, and a speaker 634.

The transceiver 610 (e.g., WCDMA, LTE, or other cellular transceiver, Bluetooth transceiver, WiFi transceiver, WiMax transceiver, etc.) is configured to communicate with the Node B 120 or another network node of the communication system 100 or another communication system. The processor circuit 600 may include one or more data processing circuits, such as a general purpose and/or special purpose processor (e.g., microprocessor and/or digital signal processor). The processor circuit 600 is configured to execute computer program instructions from the functional modules 622 of the memory device(s) 620, described below as a computer readable medium, to perform at least some of the operations and methods of FIGS. 1-5 described herein as being performed by a UE. For example, a UE according to some embodiments may include a transceiver and a processor coupled to the transceiver, wherein the processor is configured to receive parameters using the transceiver to configure enhanced uplink in a CELL_FACH state, to determine whether the user equipment node has an Enhanced uplink Dedicated CHannel (E-DCH) Radio Network Temporary Identifier (E-RNTI) value that is available for use, and to transmit data in the CELL_FACH state on a Random Access Channel (RACH) responsive to determining that the user equipment node does not have an E-RNTI value that is available for use.

Figure 7:
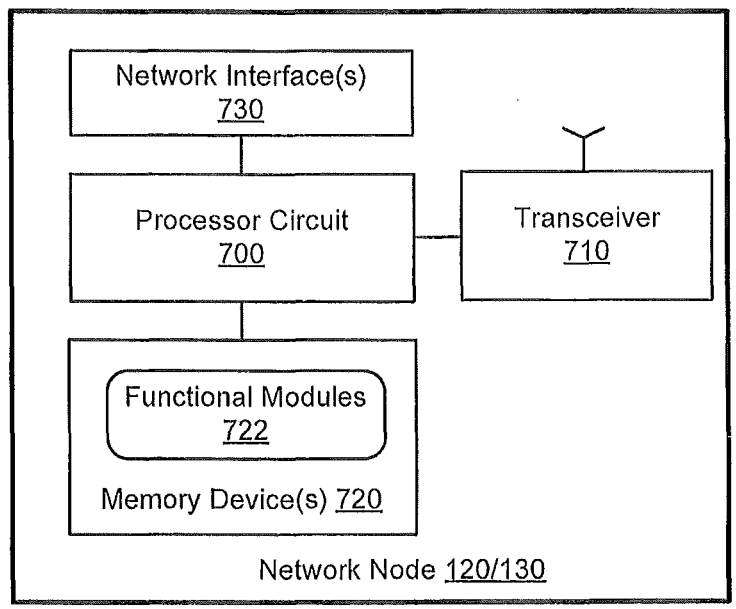
FIG. 7 is a block diagram of a network node that is configured according to some embodiments disclosed herein.

FIG. 7 is a block diagram of a network node 120/130 (e.g., Node B 120 and/or RNC 130) or another network node that is configured according to some embodiments. The network node 120/130 includes a transceiver 710, a network interface(s) 730, a processor circuit 700, and a memory device(s) 720 containing functional modules 722.

The transceiver 710 (e.g., WCDMA, LTE, or other cellular transceiver, Bluetooth transceiver, WiFi transceiver, WiMax transceiver, etc.) is configured to communicate with the UE 110 or another node of the communication system 100 or another communication system. The processor circuit 700 may include one or more data processing circuits, such as a general purpose and/or special purpose processor (e.g., microprocessor and/or digital signal processor). The processor circuit 700 is configured to execute computer program instructions from the functional modules 722 of the memory device(s) 720, described below as a computer readable medium, to perform at least some of the operations and methods of FIGS. 1-5 described herein as being performed by the network. The network interface 730 communicates with other network nodes and/or the core network 140.

Abbreviations

3GPP 3rd Generation Partnership Project
CCCH Common Control Channel
DCCH Dedicated Control Channel
DTCH Dedicated Traffic Channel
E-DCH Enhanced Uplink Dedicated Channel E-RNTI E-DCH Radio Network Temporary identifier
IE Information Element
RACH Random Access Channel
RB Radio Bearer
RRC Radio Resource Controller
SIB System Information Block
UE User Equipment Node
UL UpLink
UTRAN Universal Terrestrial Radio Access Network Further Definitions and Embodiments In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It wilt be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected," "coupled," "responsive," or variants thereof to another node, it can be directly connected, coupled, or responsive to the other node or intervening nodes may be present. In contrast, when an node is referred to as being "directly connected," "directly coupled," "directly responsive," or variants thereof to another node, there are no intervening nodes present. Like numbers refer to like nodes throughout. Furthermore, "coupled," "connected," "responsive," or variants thereof as used herein may include wirelessly coupled, connected, or responsive. As used herein, the singular forms "a," "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise," "comprising," "comprises," "include," "including," "includes," "have," "has," "having," or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.," which derives from the Latin phrase "exempli gratia," may be used to introduce or specify a general example or examples of a previously mentioned item, and is not intended to be limiting of such item. The common abbreviation "i.e.," which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method by a user equipment node for controlling uplink transmission of data to a network node of a communication system, the method comprising, the method comprising: determining, while the user equipment node is operating in CELL_FACH (Forward Access Channel) state, whether an E-DCH (Enhanced Uplink Dedicated Channel) Radio Network Temporary Identifier, or E-RNTI, is available to the user equipment node, and setting a variable READY_FOR_COMMON_EDCH in the user equipment node to a value indicating FALSE responsive to determining that the E-RNTI is not available to the user equipment node, wherein the user equipment node is configured to transmit uplink data in the CELL_FACH state on the E-DCH when the variable READY FOR COMMON EDCH is true and the E-RNTI is available to the user equipment node; while the user equipment node is in CELL_FACH state, receiving parameters to configure enhanced uplink CELL_FACH state; determining whether the user equipment node is able to communicate on the E-DCH, in CELL_FACH state in response to receiving the parameters to configure enhanced uplink; and in response to determining that the user equipment node is not able to communicate on the E-DCH in CELL_FACH state, performing a cell update operation to obtain an E-RNTI for the user equipment node for use in communicating on an E-DCH in CELL FACH state.

2. The method of claim 1, wherein determining whether the user equipment node is able to communicate on an E-DCH in CELL_FACH state comprises determining whether the user equipment node has an E-RNTI value that is available for use.

3. The method of claim 2, wherein determining whether the user equipment node is able to communicate on an E-DCH in CELL_FACH state further comprises determining whether additional defined conditions have been satisfied.

4. The method of claim 3, wherein the additional defined conditions comprise whether the user equipment node supports E-DCH transmission in CELL_FACH state, whether the information element "HS-DSCH common system information" has been received from the network node-, and whether the information element "Common E-DCH system info" has been received from the network node.

5. The method of claim 4, further comprising transmitting uplink data on an E-DCH transport channel to the network node in response to determining that the user equipment node has an E-RNTI value available for use and that the additional defined conditions are satisfied.

6. The method of claim 4, further comprising transmitting data in CELL_FACH state on a Random Access Channel, or RACH, in response to determining that any of the additional defined conditions is not satisfied.

7. The method of claim 1, further comprising transmitting data in CELL_ FACH state on a Random Access Channel, or RACH, in response to determining that the user equipment node is not able to communicate on an E-DCH in CELL_FACH state.

8. The method of claim 1, further comprising transmitting uplink data on an E-DCH transport channel to the network node in response to determining that the user equipment node is able to communicate on an E-DCH in CELL_FACH state.

9. The method of claim 1, further comprising:
determining, while the user equipment node is operating in CELL_FACH state, whether the following conditions are true:
1) the user equipment node supports E-DCH transmission in CELL_FACH state;
2) an information element "HS-DSCH common system information" is included in a received system information block type 5 or 5bis; and
3) an information element "Common E-DCH system info" is included in the received system information block type 5 or 5bis; and
setting a variable READY_FOR_COMMON_EDCH in the user equipment node to a value indicating FALSE responsive to determining that any of the conditions is not true.

10. The method of claim 9, further comprising:
setting the variable READY_FOR_COMMON_EDCH to a value indicating TRUE in response to determining that all of the conditions are true.

11. The method of claim 9, further comprising:
responding to receipt of parameters from the network node to configure enhanced uplink, in CELL_FACH state and the variable READY_FOR_COMMON_EDCH having a value indicating FALSE, by continuing transmission of uplink data in CELL_FACH state on a Random Access Channel, or RACE, transport channel.

12. The method of claim 9, further comprising:
responding to receipt of parameters from the network node to configure enhanced uplink in CELL_FACH state and the variable READY_FOR_COMMON_EDCH having a value indicating TRUE by beginning transmission of uplink data on an E-DCH transport channel.

13. The method of claim 9, further comprising performing a cell update operation to obtain an E-RNTI value responsive to setting the variable READY_FOR_COMMON_EDCH in the user equipment node to the value indicating FALSE.

14. The method of claim 1, wherein receiving parameters to configure enhanced uplink in CELL_FACH state comprises receiving an information element relating to E-DCH transmission from the network node.

15. The method of claim 14, wherein the information element comprises a "Common E-DCH System Info" information element.

16. A user equipment node, comprising: a transceiver; and a processor coupled to the transceiver; wherein the processor is configured to receive parameters using the transceiver to configure enhanced uplink in CELL_FACH (Forward Access Channel) state, to determine whether the user equipment node is able to communicate on an E-DCH (Enhanced Uplink Dedicated Channel) in CELL_FACH state, and to perform a cell update operation to obtain an E-DCH Radio Network Temporary Identifier, or E-RNTI for the user equipment node responsive to determining that the user equipment node is not able to communicate on an E-DCH in CELL_FACH state for use in communicating on an E-DCH in CELL_FACH state; and wherein the processor is further configured to determine, while the user equipment node is operating in CELL_FACH state, whether an E-RNTI is available to the user equipment node, and to set a variable READY_FOR_COMMON_EDCH in the user equipment node to a value indicating FALSE responsive to determining that the E-RNTI is not available to the user equipment node, wherein the user equipment node is configured to transmit uplink data in the CELL_FACH state on the E-DCH when the variable READY_FOR_COMMON_EDCH is true and the E-RNTI is available to the user equipment node.

17. The user equipment node of claim 16, wherein the processor is configured to determine whether the user equipment node is able to communicate on an E-DCH in CELL_FACH state by determining whether the user equipment node has an E-RNTI value that is available for use.

18. The user equipment node of claim 16, wherein the processor is further configured to determine whether additional defined conditions have been satisfied in response to receiving the parameters to configure enhanced uplink in CELL_FACH state.

19. The user equipment node of claim 18, wherein the additional defined conditions comprise whether the user equipment node supports E-DCH transmission in CELL_FACH state, whether the information element "HS-DSCH common system information" has been received from the network node, and whether the information element "Common E-DCH system info" has been received from the network node.

20. The user equipment node of claim 18, wherein the processor is further configured to transmit uplink data on an E-DCH transport channel to the network node responsive to determining that the user equipment node is able to communicate on an E-DCH in CELL_FACH state and that the additional defined conditions are satisfied.

21. The user equipment node of claim 20, wherein the processor is further configured to transmit data in CELL_FACH state on a Random Access Channel, or RACH, responsive to determining that any of the additional defined conditions has not been satisfied.

22. The user equipment node of claim 16, wherein the processor is further configured to transmit uplink data using the transceiver on an E-DCH transport channel to a network node responsive to determining that the user equipment node is able to communicate on an E-DCH in CELL_FACH state.

23. The user equipment node of claim 16, wherein the processor is further configured to transmit data in CELL_FACH state on a Random Access Channel, or RACH, responsive to determining that the user equipment node is not able to communicate on an E-DCH in CELL_FACH state.

* * * * *